(12) United States Patent
Wang et al.

(10) Patent No.: US 11,092,501 B2
(45) Date of Patent: Aug. 17, 2021

(54) ULTRASONIC TESTING DEVICE AND METHOD FOR CONNECTION FORCE OF INTERFERENCE FIT

(71) Applicant: DALIAN UNIVERSITY OF TECHNOLOGY, Liaoning (CN)

(72) Inventors: Xiaodong Wang, Liaoning (CN); Xingyuan Wang, Liaoning (CN); Zhifeng Lou, Liaoning (CN); Yue Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 50 days.

(21) Appl. No.: 16/621,175

(22) PCT Filed: Jun. 26, 2019

(86) PCT No.: PCT/CN2019/092875
§ 371 (c)(1),
(2) Date: Dec. 10, 2019

(87) PCT Pub. No.: WO2020/038104
PCT Pub. Date: Feb. 27, 2020

(65) Prior Publication Data
US 2020/0309623 A1    Oct. 1, 2020

(30) Foreign Application Priority Data

Aug. 22, 2018   (CN) .......................... 201810956534.X

(51) Int. Cl.
*G01L 1/26*       (2006.01)
*G01L 1/00*       (2006.01)
*G01L 5/00*       (2006.01)

(52) U.S. Cl.
CPC ................. *G01L 1/26* (2013.01); *G01L 1/005* (2013.01); *G01L 5/00* (2013.01)

(58) Field of Classification Search
CPC ... G01L 1/255; G01B 17/00–08; G01B 17/06; G01N 29/223; G01N 29/27;
(Continued)

(56) References Cited

U.S. PATENT DOCUMENTS

| 4,170,891 A | * | 10/1979 | Elsner | .................... G01B 17/00 |
| | | | | 73/1.83 |
| 4,215,585 A | * | 8/1980 | Kunii | .................... A61B 8/4281 |
| | | | | 367/104 |

(Continued)

FOREIGN PATENT DOCUMENTS

| CN | 101419194 A | 4/2009 |
| CN | 103278411 A | 9/2013 |

(Continued)

*Primary Examiner* — Tran M. Tran
(74) *Attorney, Agent, or Firm* — Muncy, Geissler, Olds & Lowe, P.C.

(57) ABSTRACT

An ultrasonic testing device and method for the connection force of interference fit. The motion control module can realize accurate positioning for the interference fit part and accurate control for motion in the circumferential direction and the axial direction; scanning increments of the circumferential direction and the axial direction are set, and the motion control module drives the interference fit part to perform circumferential and axial point scanning until the testing of the whole matching surface is completed. The ultrasonic signal measured by the point focusing water immersion probe is transmitted to a PC through a control loop in the testing process. Then the stress distribution of the matching surface is obtained through the relationship between the ultrasonic signal and contact stress Finally, the size of the connection force is calculated according to the static friction coefficient.

1 Claim, 5 Drawing Sheets

(58) Field of Classification Search
CPC .. G01N 29/2456; G01N 29/221; G01N 29/28;
G01N 29/265
See application file for complete search history.

(56) References Cited

U.S. PATENT DOCUMENTS

| | | | | |
|---|---|---|---|---|
| 4,387,596 A * | 6/1983 | Fenkner | ............ | G01N 29/27 73/593 |
| 4,484,475 A * | 11/1984 | Ogura | ............ | G01L 1/255 73/579 |
| 4,641,532 A * | 2/1987 | Rohrer | ............ | G01N 29/265 73/637 |
| 4,870,866 A * | 10/1989 | Slack | ............ | G01L 5/246 73/599 |
| 5,005,417 A * | 4/1991 | Kawasaki | ............ | G01N 29/041 73/593 |
| 5,054,321 A * | 10/1991 | Horvath | ............ | G01S 7/52006 73/597 |
| 5,056,368 A * | 10/1991 | Kawasaki | ............ | G01N 29/221 73/642 |
| 5,060,517 A * | 10/1991 | Fushimi | ............ | G01N 29/26 73/620 |
| 5,133,220 A * | 7/1992 | Alford | ............ | F01D 21/003 73/866.5 |
| 5,184,513 A * | 2/1993 | Nishioka | ............ | G01N 29/27 294/104 |
| 5,195,372 A * | 3/1993 | Fushimi | ............ | G01N 29/11 73/593 |
| 5,257,544 A * | 11/1993 | Khuri-Yakub | ............ | G01H 13/00 73/579 |
| 5,280,725 A * | 1/1994 | Stengel | ............ | G01L 5/24 324/209 |
| 5,596,508 A * | 1/1997 | Cuffe | ............ | G01B 17/02 702/171 |
| 5,646,351 A * | 7/1997 | Good | ............ | G01N 29/26 702/166 |
| 5,700,955 A * | 12/1997 | Roth | ............ | G01B 17/06 702/142 |
| 6,477,473 B2 * | 11/2002 | Bray | ............ | G01L 1/255 702/42 |
| 6,550,333 B1 * | 4/2003 | Kiuchi | ............ | F16H 15/38 73/593 |
| 6,588,278 B1 * | 7/2003 | Takishita | ............ | G01N 29/0645 73/609 |
| 6,604,420 B2 * | 8/2003 | Hawbaker | ............ | G01N 29/2412 73/150 A |
| 7,004,016 B1 * | 2/2006 | Puskas | ............ | B01J 19/10 73/64.53 |
| 7,528,598 B2 * | 5/2009 | Goldfine | ............ | G01N 27/82 324/240 |
| 7,617,733 B2 * | 11/2009 | Deemer | ............ | G01N 29/041 73/593 |
| 7,633,634 B2 * | 12/2009 | Spalding | ............ | G01B 11/27 356/635 |
| 7,730,784 B2 * | 6/2010 | Georgeson | ............ | G01L 5/246 73/579 |
| 7,735,369 B2 * | 6/2010 | Young | ............ | G01N 29/28 73/622 |
| 7,779,691 B2 * | 8/2010 | Ghoshal | ............ | G01M 13/045 73/593 |
| 8,660,804 B2 * | 2/2014 | Schnell | ............ | G01N 29/11 702/39 |
| 8,973,441 B1 * | 3/2015 | Nelson | ............ | G01N 29/043 73/602 |
| 9,116,097 B2 * | 8/2015 | Gayle | ............ | G01N 29/28 |
| 9,752,969 B2 * | 9/2017 | Werner | ............ | G01N 29/14 |
| 9,804,129 B2 * | 10/2017 | Fetzer | ............ | G01N 29/225 |
| 9,945,817 B2 * | 4/2018 | Pember | ............ | G01N 29/0609 |
| 9,995,727 B2 * | 6/2018 | Feng | ............ | G01N 3/08 |
| 10,295,505 B2 * | 5/2019 | Barbato | ............ | G01N 33/4833 |
| 10,502,563 B2 * | 12/2019 | Tanaka | ............ | G01B 17/06 |
| 10,788,461 B2 * | 9/2020 | Mizuno | ............ | G01N 29/265 |
| 10,955,386 B2 * | 3/2021 | Doyle | ............ | G01N 29/265 |
| 2004/0020297 A1 * | 2/2004 | Ziola | ............ | G01N 29/0618 73/634 |
| 2009/0031811 A1 | 2/2009 | Georgeson et al. | | |
| 2011/0061465 A1 * | 3/2011 | Kraemer | ............ | G01N 29/225 73/625 |
| 2013/0145848 A1 * | 6/2013 | Jun | ............ | G01N 29/265 73/587 |
| 2019/0064014 A1 * | 2/2019 | Sun | ............ | G01N 3/42 |
| 2019/0072527 A1 * | 3/2019 | Doyle | ............ | G01N 29/245 |
| 2019/0294267 A1 * | 9/2019 | Zhao | ............ | G01B 21/20 |
| 2020/0033298 A1 * | 1/2020 | Dayton | ............ | G01N 35/0099 |

FOREIGN PATENT DOCUMENTS

| | | |
|---|---|---|
| CN | 107238345 A | 10/2017 |
| CN | 109060207 A | 12/2018 |

* cited by examiner

ULTRASONIC TESTING DEVICE AND METHOD FOR CONNECTION FORCE OF INTERFERENCE FIT

TECHNICAL FIELD

The present invention belongs to the field of nondestructive testing, and proposes an ultrasonic testing device and method for the connection force of interference fit with respect to the problem that the connection force of interference fit part cannot be tested under nondestructive testing conditions.

BACKGROUND

Interference fit has high load capacity and good coaxiality, and thus is widely applied in the fields of aviation, aerospace, ships and precision instruments. The connection force of the interference fit part is one of important factors that affect the matching performance of the part. Currently, the connection force of the interference fit part is mainly predicted by the empirical relationship between the connection force and the maximum pressing force, and the reliability of the prediction result is low due to the influence of form error. In addition, the connection force of the interference fit part assembled by temperature difference method cannot be predicted by this method. Especially for the fields having high connection force requirements, such as aviation, aerospace and precision instruments, each part needs to be tested, thereby greatly reducing the production efficiency. Therefore, the current testing method seriously restricts the reliability of the prediction result of the connection force and the production efficiency, and is difficult to satisfy the current production demands.

SUMMARY

The problem to be solved in the present invention is to overcome the defects of the prior art, and invent an ultrasonic testing device and method for the connection force of interference fit, which can realize measurement of the connection force of an interference fit part and high testing accuracy of interference connection quality.

To achieve the above purpose, the present invention adopts the following specific technical solution:

An ultrasonic testing device for the connection force of interference fit is provided. The ultrasonic testing device for the connection force of interference fit comprises an optical table 1, a motion control module, a fixture 8, a probe adjustment module, a couplant tank adjustment module and a control loop.

The motion control module comprises an X-axis precision linear stage 2, a Y-axis precision linear stage 3, a platform mounting plate 4, a rotation stage mounting plate 5, a Z-axis precision linear stage 6 and a precision rotation stage 7. The X-axis precision linear stage 2 is fixedly mounted on the optical table 1; the Y-axis precision linear stage 3 is fixedly mounted above the X-axis precision linear stage 2; and the Z-axis precision linear stage 6 is fixedly connected with the upper end of the Y-axis precision linear stage 3 through the platform mounting plate 4. The X-axis precision linear stage 2, the Y-axis precision linear stage 3 and the Z-axis precision linear stage 6 are perpendicular to each other in motion direction to form a Cartesian rectangular coordinate system. The precision rotation stage 7 is fixedly mounted on the Z-axis precision linear stage 6 through the rotation stage mounting plate 5.

The fixture 8 comprises a fixture bottom plate 8-1, a movable V-type block 8-2 and a fixed V-type block 8-3. The fixture bottom plate 8-1 is fixedly mounted on the precision rotation stage 7 through bolts; the fixed V-type block 8-3 is fixedly connected with the fixture bottom plate 8-1 through bolts; and the movable V-type block 8-2 is connected with the fixed V-type block 8-3 through bolts. The movable V-type block 8-2 is adjusted by the bolt to clamp or release the interference fit part 9. In addition, under the clamping state, the axis of the interference fit part 9 shall be ensured to be coaxial with the rotating axis of the precision rotation stage 7.

The probe adjustment module comprises a probe holder rod 10, a Z-type bracket 12 and an XY goniometer stage 15. The XY goniometer stage 15 is fixedly mounted on the optical table 1 through bolts. The Z-type bracket 12 is fixedly connected with the XY goniometer stage 15. The probe holder rod 10 is fixedly mounted on the Z-type bracket 12 through bolts. A point focusing water immersion probe 11 is mounted on the probe holder rod 10.

The couplant tank adjustment module comprises a couplant tank 13 and a lift platform 14. The couplant tank 13 is mounted on the center of the upper end of the lift platform 14, and the lift platform 14 is fixedly mounted on the optical table 1.

The control loop comprises a PC 18, an oscilloscope 17, an ultrasonic pulse transceiver 16, a point focusing water immersion probe 11, a motion control card 19, a step-motor driver 20, an X-axis precision linear stage 2, a Y-axis precision linear stage 3 and, a Z-axis precision linear stage 6 and a precision rotation stage 7. The motion control card 19 is positioned in the PC 18; the oscilloscope 17 is connected with the PC 18; the ultrasonic pulse transceiver 16 is connected with the oscilloscope 17; the point focusing water immersion probe 11 is connected with the ultrasonic pulse transceiver 16; and the step-motor driver 20 is respectively connected with the motion control card 19, the X-axis precision linear stage 2, the Y-axis precision linear stage 3, the Z-axis precision linear stage 6 and the precision rotation stage 7 through conducting wires. The ultrasonic signal measured by the point focusing water immersion probe 11 is transmitted to the PC 18 through the control loop; then the stress distribution of the matching surface is automatically computed through a relationship between the ultrasonic signal and contact stress; and finally, the magnitude of the connection force between the cylindrical part 9-1 and the shaft part 9-2 is obtained by calculating the product of the stress distribution and the coefficient of static friction.

Measurement principle of the device: the fixture 8 is used for fixing the interference fit part 9; the motion control module drives the interference fit part 9 to move to the testing position; the couplant tank adjustment module adjusts the height of the couplant tank 13 so that the interference fit part 9 and the point focusing water immersion probe 11 are completely immersed into the couplant. The probe adjustment module is adjusted so that the axis of the point focusing water immersion probe 11 is perpendicular to the axis of the interference fit part 9. The scanning increments in the circumferential direction and the axial direction are set, and then the precision rotation stage 7 drives the interference fit part 9 to rotate and perform circumferential scanning, and next moves by one increment in the axial direction and performs circumferential scanning. The above two steps are repeated like this until the scanning of the whole matching surface is completed. In the measurement process, the data is transmitted from the control loop to the PC 18, and the stress of the matching surface is automatically solved according to the relationship between the ultrasonic signal and the stress. Finally, the size of the connection force is calculated according to the stress distribution and the static friction coefficient.

The above ultrasonic testing device for the connection force of interference fit measures the connection force by the method which comprises the following steps:

First step: mounting and clamping adjusting the movable V-type block 8-2 on the fixture 8 through the bolt for clamping and fixing a shaft part 9-2 of the interference fit part 9.

Second step: position adjustment driving the interference fit part 9 to move to the testing position by the X-axis precision linear stage 2, the Y-axis precision linear stage 3 and the Z-axis precision linear stage 6; then adjusting the XY goniometer stage 15 so that the axis of the point focusing water immersion probe 11 is perpendicular to the axis of the interference fit part 9, so that the ultrasonic signal generated by the point focusing water immersion probe 11 can be refracted in a cylindrical part 9-1 and focused on the matching surface between the cylindrical part 9-1 and the shaft part 9-2; next, manually adjust the lift platform 14 so that the point focusing water immersion probe 11 and the interference fit part 9 are completely immersed into the couplant in the couplant tank 13.

Third step: stress distribution measurement setting the scanning increments in the circumferential direction and the axial direction; then driving, by the precision rotation stage 7, the interference fit part 9 to rotate and perform circumferential scanning; recording the ultrasonic signal measured by the point focusing water immersion probe 11 at each scanning point until the precision rotation stage 7 rotates by 360 degrees; next, driving, by the Z-axis precision linear stage 6, the interference fit part 9 to move by one increment along the axial direction; driving, by the precision rotation stage 7, the interference fit part 9 to rotate to perform circumferential point scanning; and repeating the above scanning steps until the scanning of the whole matching surface is completed.

Fourth step: computation of connection force automatically computing the stress distribution of the matching surface by the PC 18 according to the relationship between the ultrasonic signal and the stress; and then automatically computing the magnitude of the connection force by calculating the product of the contact stress and the static friction coefficient between the shaft part 9-2 and cylindrical part 9-1, i.e. friction force between shaft part 9-2 and cylindrical part 9-1; and the static friction coefficient can be measured using a friction tester.

The present invention has the beneficial effects: (1) all work can realize automatic operation except feeding, thereby avoiding adverse effects of human factors and increasing working efficiency. (2) The motion control module, the fixture and the probe adjustment module in the device have high repeated positioning accuracy to ensure the testing accuracy of the part. (3) The ultrasonic point focusing probe not only realizes nondestructive measurement of the connection force of the interference fit part, but also realizes visualization of the stress distribution of the matching surface and is used for defect analysis of the matching surface.

Figure 1:
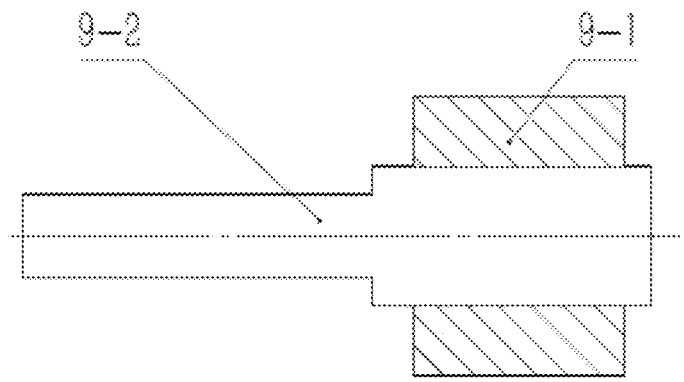
FIG. 1 is a schematic diagram of an internal structure of a tested part.
Figure 2:
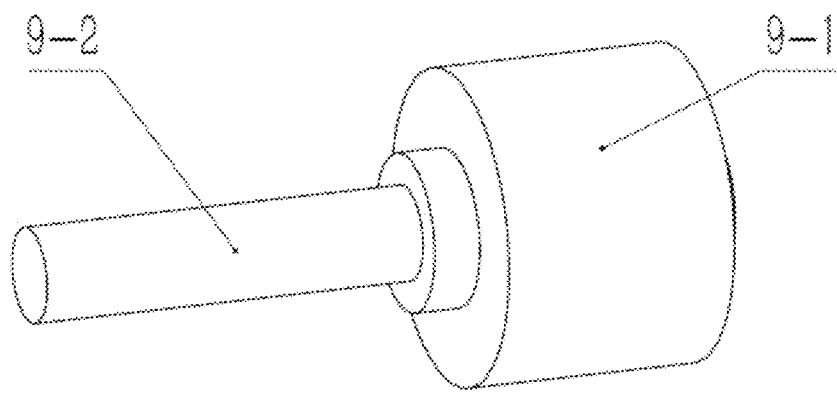
FIG. 2 is an outline diagram of a tested part.
Figure 3:
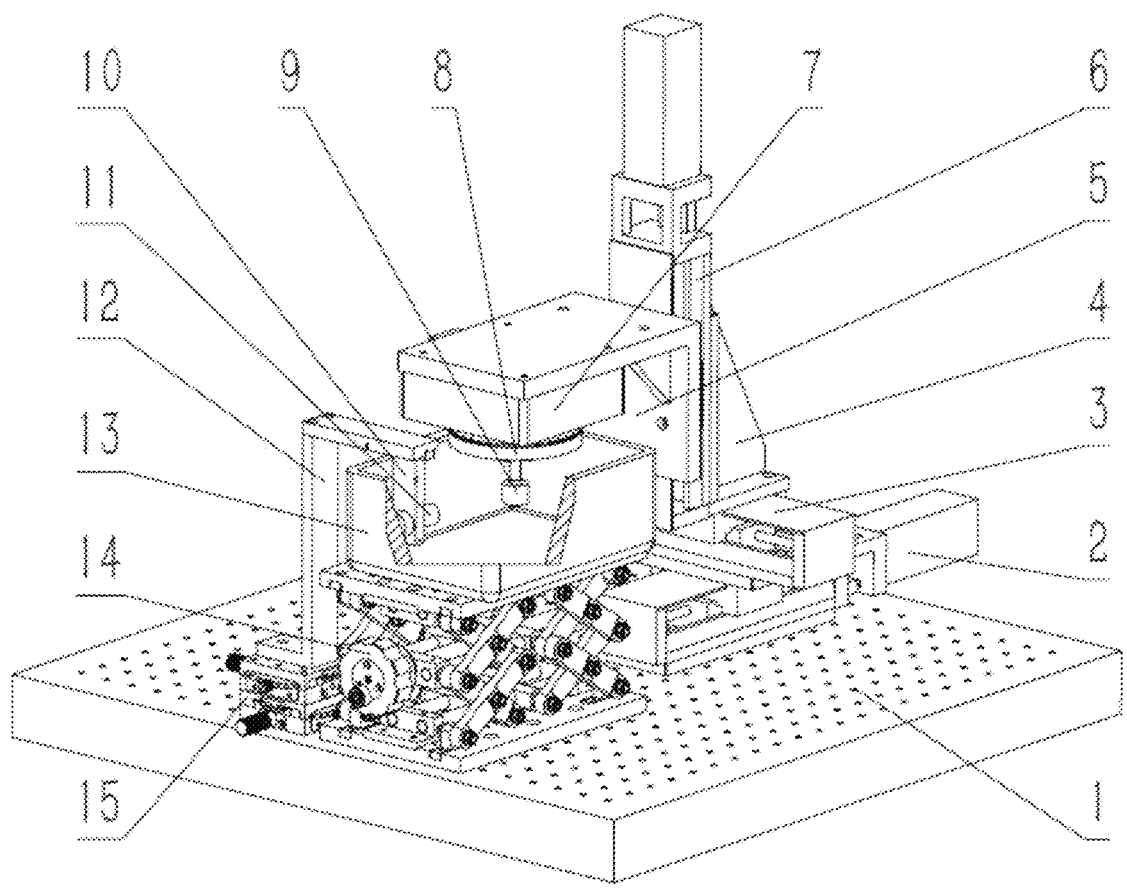
FIG. 3 is an overall structural schematic diagram of a device
Figure 4:
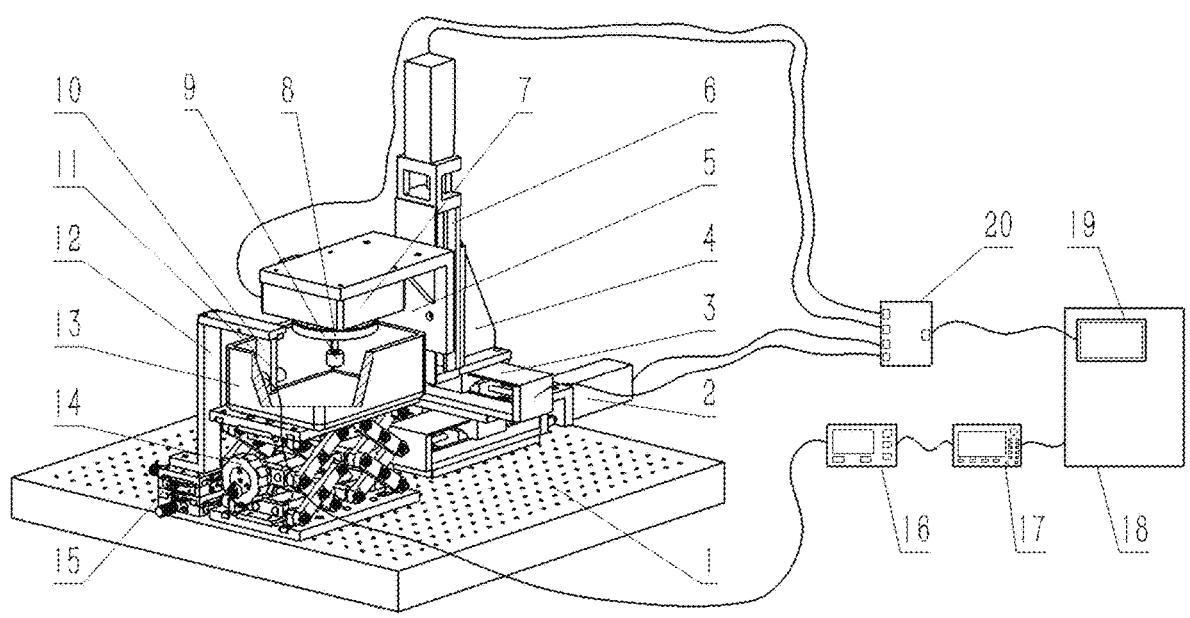
FIG. 4 is an overall schematic diagram of a testing device.
Figure 5:
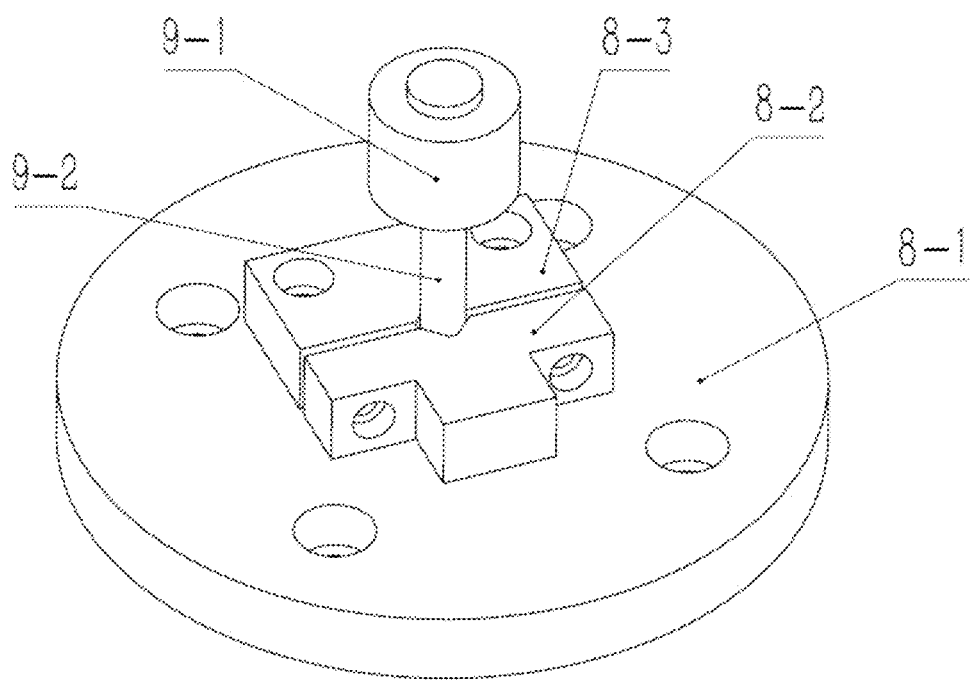
FIG. 5 is a structural schematic diagram of a fixture.
Figure 6:
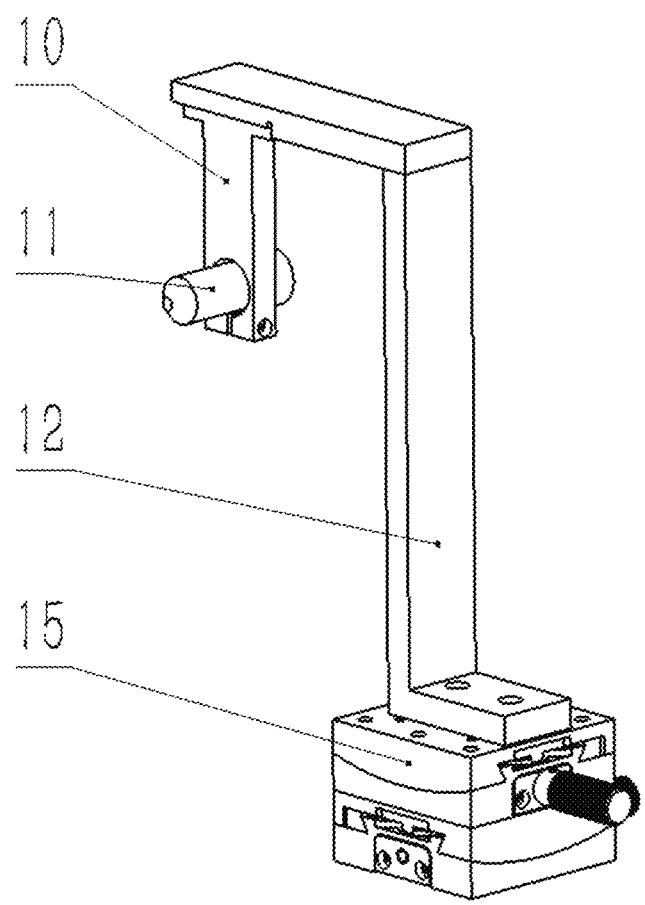
FIG. 6 is a structural schematic diagram of a probe adjustment module

In the figures: 1 optical table; 2 X-axis precision linear stage; 3 Y-axis precision linear stage; 4 platform mounting plate; 5 rotation stage mounting plate; 6 Z-axis precision linear stage; 7 precision rotation stage; 8 fixture; 8-1 fixture bottom plate; 8-2 movable V-type block; 8-3 fixed V-type block; 9 interference fit part; 9-1 cylindrical part; 9-2 shaft part; 10 probe holder rod; 11 point focusing water immersion probe; 12 Z-type bracket; 13 couplant tank; 14 lift platform; 15 XY goniometer stage; 16 ultrasonic pulse transceiver; 17 oscilloscope; 18 PC; 19 motion control card; and 20 step-motor driver.

DETAILED DESCRIPTION

Specific embodiments of the present invention are described below in detail in combination with the technical solution and accompanying drawings.

An ultrasonic testing device for the connection force of interference fit is provided. The ultrasonic testing device for the connection force of interference fit comprises an optical table 1, a motion control module, a fixture 8, a probe adjustment module, a couplant tank adjustment module and a control loop.

The motion control module comprises an X-axis precision linear stage 2, a Y-axis precision linear stage 3, a platform mounting plate 4, a rotation stage mounting plate 5, a Z-axis precision linear stage 6 and a precision rotation stage 7. The X-axis precision linear stage 2 is fixedly mounted on the optical table 1; the Y-axis precision linear stage 3 is fixedly mounted above the X-axis precision linear stage 2; and the Z-axis precision linear stage 6 is fixedly connected with the upper end of the Y-axis precision linear stage 3 through the platform mounting plate 4. The X-axis precision linear stage 2, the Y-axis precision linear stage 3 and the Z-axis precision linear stage 6 are perpendicular to each other in motion direction to form a Cartesian rectangular coordinate system. The precision rotation stage 7 is fixedly mounted on the Z-axis precision linear stage 6 through the rotation stage mounting plate 5.

The fixture 8 comprises a fixture bottom plate 8-1, a movable V-type block 8-2 and a fixed V-type block 8-3. The fixture bottom plate 8-1 is fixedly mounted on the precision rotation stage 7 through bolts; the fixed V-type block 8-3 is fixedly connected with the fixture bottom plate 8-1 through bolts; and the movable V-type block 8-2 is connected with the fixed V-type block 8-3 through bolts. The movable V-type block 8-2 is adjusted by the bolt to clamp or release the interference fit part 9. In addition, under the clamping state, the axis of the interference fit part 9 shall be ensured to be coaxial with the rotating axis of the precision rotation stage 7.

The probe adjustment module comprises a probe holder rod 10, a Z-type bracket 12 and an XY goniometer stage 15. The XY goniometer stage 15 is fixedly mounted on the optical table 1 through the bolt. The Z-type bracket 12 is fixedly connected with the XY goniometer stage 15. The probe holder rod 10 is fixedly mounted on the Z-type bracket 12 through the bolt. A point focusing water immersion probe 11 is mounted on the probe holder rod 10.

The couplant tank adjustment module comprises a couplant tank 13 and a lift platform 14. The couplant tank 13 is mounted on the upper end part of the lift platform 14, and the lift platform 14 is fixedly mounted on the optical table 1.

The control loop comprises a PC, an oscilloscope, an ultrasonic pulse transceiver, the point focusing water immersion probe 11, a motion control card, a step-motor driver, the X-axis precision linear stage 2, the Y-axis precision linear stage 3 and the Z-axis precision linear stage 6. The motion control card is positioned in the PC; the oscilloscope is connected with the PC; the ultrasonic pulse transceiver is connected with the oscilloscope; the point focusing water immersion probe 11 is connected with the ultrasonic pulse transceiver; and the step-motor driver is respectively connected with the motion control card and the precision linear stages through conducting wires.

The above ultrasonic testing device for the connection force of interference fit measures the connection force by a method which comprises the following steps:

First step: mounting and clamping adjusting the movable V-type block 8-2 on the fixture 8 through the bolt for clamping and fixing the shaft part 9-2 of the interference fit part 9.

Second step: position adjustment driving the interference fit part 9 to move to a testing position by the X-axis precision linear stage 2, the Y-axis precision linear stage 3 and the Z-axis precision linear stage 6; then adjusting the XY goniometer stage 15 so that the axis of the point focusing water immersion probe 11 is perpendicular to the axis of the interference fit part 9, so that the ultrasonic signal generated by the point focusing water immersion probe 11 can be refracted in a cylindrical part 9-1 and focused on the matching surface between the cylindrical part 9-1 and the shaft part 9-2; next, manually adjust the lift platform 14 so that the point focusing water immersion probe 11 and the interference fit part 9 are completely immersed into a couplant in the couplant tank 13.

Third step: stress distribution measurement setting the scanning increments in the circumferential direction and the axial direction; then driving, by the precision rotation stage 7, the interference fit part 9 to rotate and perform circumferential scanning; recording the ultrasonic signal measured by the point focusing water immersion probe 11 at each scanning point until the precision rotation stage 7 rotates by 360 degrees; next, driving, by the Z-axis precision linear stage 6, the interference fit part 9 to move by one increment along the axial direction; driving, by the precision rotation stage 7, the interference fit part 9 to rotate to scan in circumferential points; and repeating the above scanning steps until the scanning of the whole fit surface is completed.

Fourth step: computation of connection force automatically computing the stress distribution of the fit surface by the PC 18 according to the relationship between the ultrasonic signal and the stress; and then automatically computing the magnitude of the connection force by calculating the product of the contact stress and the static friction coefficient between the shaft part 9-2 and cylindrical part 9-1, i.e. friction force between shaft part 9-2 and cylindrical part 9-1; and the static friction coefficient can be measured using a friction tester.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A method for measuring a connection force of interference fit with an ultrasonic testing device, the ultrasonic testing device for the connection force of interference fit, comprising an optical table, a motion control module, a fixture, a probe adjustment module, a couplant tank adjustment module and a control loop, wherein the motion control module comprises an X-axis precision linear stage, a Y-axis precision linear stage, a platform mounting plate, a rotation stage mounting plate, a Z-axis precision linear stage and a precision rotation stage; the X-axis precision linear stage is fixedly mounted on the optical table through bolts; the Y-axis precision linear stage is fixedly mounted on the sliding table of the X-axis precision linear stage; and the Z-axis precision linear stage is fixedly connected with the sliding table of the Y-axis precision linear stage through the platform mounting plate; the X-axis precision linear stage, the Y-axis precision linear stage and the Z-axis precision linear stage are perpendicular to each other in a motion direction to form a Cartesian rectangular coordinate system; the precision rotation stage is fixedly mounted on the Z-axis precision linear stage through the rotation stage mounting plate; the rotating axis of the precision rotation stage is parallel to the Z-axis precision linear stage;

the fixture comprises a fixture bottom plate, a movable V-type block and a fixed V-type block; the fixture bottom plate is fixedly mounted on the precision rotation stage through a first plurality of bolts; the fixed V-type block is fixedly connected with the fixture bottom plate through a second plurality of bolts; and the movable V-type block is connected with the fixed V-type block through a third plurality of bolts; the movable V-type block is adjusted by the third plurality of bolts to clamp or release an interference fit part composed of a shaft part and a cylindrical part; in addition, under the clamping state, the axis of the interference fit part, which is coincides with the axis of the shaft part and cylindrical part, shall be ensured to be coaxial with the rotating axis of the precision rotation stage;

the probe adjustment module comprises a probe holder rod, a Z-type bracket and an XY goniometer stage; the XY goniometer stage is fixedly mounted on the optical table through bolts; the Z-type bracket is fixedly connected with the XY goniometer stage; the probe holder rod is fixedly mounted on the Z-type bracket through bolts; a point focusing water immersion probe is mounted on the probe holder rod; the axis of the point focusing water immersion probe is parallel to the X-axis precision linear stage and in the XY plane formed by the X-axis precision linear stage and the Y-axis precision linear stage;

the couplant tank adjustment module comprises a couplant tank and a lift platform; the couplant tank is mounted on a center of the upper end of the lift platform through bolts, and the lift platform is fixedly mounted on the optical table to ensure the point focusing water immersion probe and the interference fit part can be immersed into the couplant tank;

the control loop comprises a PC, an oscilloscope, an ultrasonic pulse transceiver, the point focusing water immersion probe, a motion control card, a step-motor driver, the X-axis precision linear stage, the Y-axis precision linear stage, the Z-axis precision linear stage and the precision rotation stage;

the motion control card is positioned in the PC; the oscilloscope is connected with the PC; the ultrasonic pulse transceiver is connected with the oscilloscope; the point focusing water immersion probe is connected with the ultrasonic pulse transceiver; and the step-motor driver is respectively connected with the motion control card and the precision linear stages through conducting wires; the ultrasonic signal measured by the point focusing water immersion probe is transmitted to the PC through the control loop; then the stress distribution of a matching surface is automatically computed through a relationship between the ultrasonic signal and contact stress; and finally, the size of the connection force is solved according to static friction coefficient; the method comprising the following steps:

first step: adjusting the movable V-type block on the fixture through the bolt for clamping and fixing the shaft part of the interference fit part;

second step: driving the interference fit part to move to the testing position by the X-axis precision linear stage, the Y-axis precision linear stage and the Z-axis precision linear stage; then adjusting the XY goniometer stage so that the axis of the point focusing water immersion probe is perpendicular to the axis of the interference fit part, so that the ultrasonic signal generated by the point focusing water immersion probe can be refracted in a cylindrical part and focused on the matching surface between the cylindrical part and the shaft part; next, manually adjust the lift platform so that the point focusing water immersion probe and the interference fit part are completely immersed into the couplant in the couplant tank;

third step: setting the scanning increments in the circumferential direction and the axial direction; then driving, by the precision rotation stage, the interference fit part to rotate and perform circumferential scanning; recording the ultrasonic signal measured by the point focusing water immersion probe at each scanning point until the precision rotation stage rotates by 360 degrees; next, driving, by the Z-axis precision linear stage, the interference fit part to move by one increment along the axial direction; driving, by the precision rotation stage, the interference fit part to rotate to perform circumferential point scanning; and repeating the above scanning steps until the scanning of the whole matching surface is completed;

fourth step: automatically computing the stress distribution of the matching surface by the PC according to the relationship between the ultrasonic signal and the stress; and automatically computing the magnitude of the connection force by calculating the product of the contact stress and the static friction coefficient between the shaft part and cylindrical part, i.e. friction force between shaft part and cylindrical part; and the static friction coefficient can be measured using a friction tester.

* * * * *